(No Model.)
W. W. HODGES.
CAR BRAKE.
No. 490,711. Patented Jan. 31, 1893.
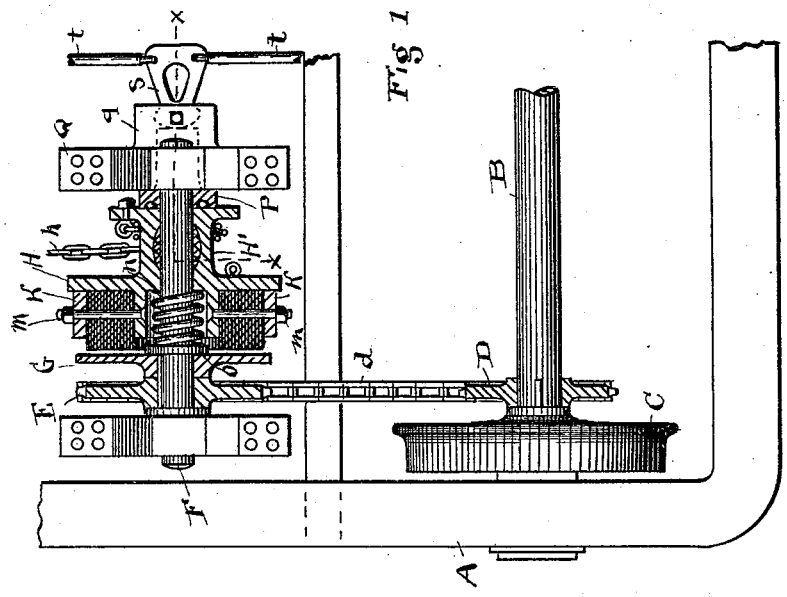
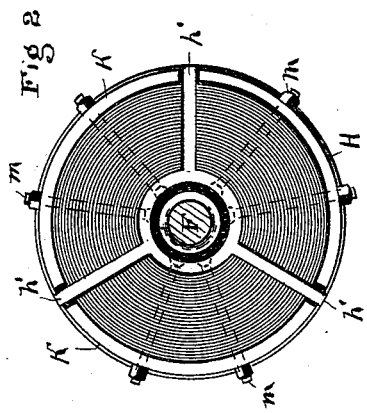
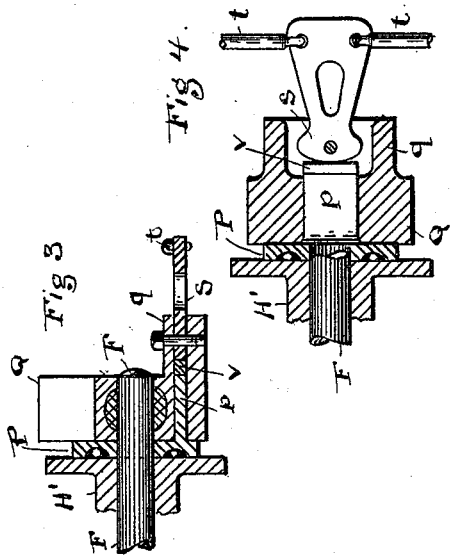
Witnesses
P. B. Moser
Georgia Schaeffer
Inventor
WILLIAM W. HODGES
By H. J. Fisher
Attorney

UNITED STATES PATENT OFFICE.

WILLIAM W. HODGES, OF CLEVELAND, OHIO.

CAR-BRAKE.

SPECIFICATION forming part of Letters Patent No. 490,711, dated January 31, 1893.

Application filed November 9, 1892. Serial No. 451,429. (No model.)

*To all whom it may concern:*

Be it known that I, WILLIAM W. HODGES, a citizen of the United States, residing at Cleveland, in the county of Cuyahoga and State of Ohio, have invented certain new and useful Improvements in Car-Brakes; and I do hereby declare that the following is a full, clear, and exact description of the invention, which will enable others skilled in the art to which it appertains to make and use the same.

My improvement relates to car brakes, and is of the variety in which friction clutch mechanism actuated by the motor-man derives its braking power from the momentum of the car, all substantially as shown and described and particularly pointed out in the claims.

In the accompanying drawings, Figure 1 shows a section of a car truck in which the friction mechanism is sectioned horizontally on the line of the shaft or axle of said mechanism, and the view is taken in plan to reveal the arrangement of the parts in respect to one another and to the truck. Fig. 2 is a front or face elevation of the friction wheel proper. Fig. 3 is a vertical section of the friction wheel operating mechanism and its associated parts taken substantially on the line $x, x$, Fig. 1, and showing the means to put it into engagement. Fig. 4 is a sectional view at right angles to Fig. 3, and of the same parts, and is designed more especially to reveal the cam and the relation and connection thereof with the other parts.

A represents the truck of the car, only a fraction or fragment of which is shown here but sufficient to fully illustrate the invention, and B is a car axle, and C a car wheel. The axle B has a sprocket wheel D fixed thereon, and connected by a sprocket chain $d$ with a sprocket wheel E splined or keyed, or otherwise rigidly fixed upon the shaft F. Hence, when the car is moving and the axle B turning, the sprocket wheel E and the shaft F necessarily turn therewith. The said shaft F is secured in suitable hangers or supports which may be fixed to the body of the car or to the truck, as may seem most desirable.

By the side of the sprocket wheel E I secure a friction disk G, which likewise is splined or keyed permanently upon the shaft F and turns therewith. Frictional engagement is made with this disk G by or through the friction wheel H, which is free to turn upon the shaft F and has the drum H' formed therewith, as here shown, or secured rigidly thereto and serving to carry the chain or cable $h$ through which the brake cars and shoes are operated. This friction wheel is provided with three several radiating flanges $h'$ upon its face, which sub-divide the face of the wheel into three compartments, and a separate segmental band section, $k$, is employed with each compartment to hold the paper on. The friction material consists of layers of suitable paper, one sheet superposed or placed upon the other until a sufficient depth or thickness thereof is obtained to fill one of said compartments, and the sheets are cut suitably as to length to fit the place they are to occupy in the pile. The paper thus arranged is designed to be pressed closely together so as to be made very compact and firm, and may be glued or cemented, or otherwise pasted between the leaves or strips before putting into the wheel so as to make, practically, a block of paper adapted to the compartments. The paper thus prepared extends laterally beyond the edge of the flanges $h$, and the segments $k$ a sufficient distance to become the sole contact surface with the friction disk G, and the paper in each compartment is secured therein by means of the segments $k$, and the tightening bolts $m$ which pass through the said segments and through the hub of the wheel.

Several material advantages are obtained by this construction. In the first place by dividing the paper into sections substantially as herein shown, each section or block can be separately removed and replaced without disturbing the other sections, so that if, for any reason, there be imperfection in any portion of the friction material, the defective portion can be removed without casting the whole away. It will also be observed that by this arrangement the edges of the paper are exposed to wear, and that the wear is transverse to the fiber and not in a line with it. This makes a much more durable and lasting construction than would be possible if the wear were flat with the face of the paper, because in that case there would be a constant liability to a ragged surface by reason of the sheets wearing through in places, and of one sheet after another being worn off or torn off by the severe friction to which it is subjected. Indeed, by my construction the friction paper thus prepared and arranged will wear for an indefinite period and do effective service.

Within the wheel H on the shaft F I place a spring $n$, which bears against a collar $o$ and serves to throw said wheel out of engagement with the friction disk when the brake is relaxed or released. The movement of the said wheel H toward and from the friction disk G obviously need be very slight, because simply to remove the wheel H from contact with the disk and not have it wear thereon is sufficient, and a very slight movement, therefore, is all that is needed. Relatively the distance shown in Fig. 1 is sufficient, where the parts are just out of friction engagement. To throw them into friction engagement, I employ a collar P, which is placed loosely upon the shaft F between the hanger Q therefor and the outside of the drum, which is integral with the friction wheel H. This collar has a projection or arm $p$ on its lower portion, extending out through the lower portion of the hanger Q. In the outward projection $q$ of the said hanger is pivoted the cam $s$ arranged to be operated horizontally through the rods or connections $t$, which extend thence to the brake lever or mechanism at either end of the car.

The cam $s$ is constructed to bear against the projection $p$ when it is turned on its pivot in either direction, and thus serves to force the collar P inward against the drum H' and in this way to bring the friction wheels into engagement. When this occurs the drum H' will, of course, turn with the friction wheel and the chain $h$ which leads to the brake bar will be drawn up and the brake will be set against the car wheel, and the braking of the car occurs by reason of the movement or momentum of the car, as hereinbefore described. It will be seen, therefore, that the operator need only set the friction mechanism through the cam $s$, which will require little exertion on his part, and that the momentum of the car will do the rest. I prefer to use anti-friction balls $v$ between the collar P and the drum H', but a plain smooth friction surface may be used.

A loose strip of hard steel $v$ is inserted between the cam $s$ and the projection $p$ to take the wear that comes at this point, and said strip is held between the sides of the lateral projection $q$.

Having thus described my invention, what I claim is:

1. The friction mechanism herein described, comprising a shaft, a friction disk keyed on said shaft, a friction wheel, having its face constructed to engage said disk and provided with a drum for the brake chain and a sliding collar and cam to force said wheel into friction engagement, substantially as described.

2. The shaft carrying the friction mechanism, the friction disk fixed on the shaft, the friction wheel having a paper surface to engage the disk and free to slide on the said shaft, in combination with a collar on said shaft having a lateral projection and a cam pivoted to engage said projection, substantially as described.

3. In friction mechanism for cars, the shaft and the friction wheels thereon, in combination with a collar on said shaft having a projection extending through the hanger of said shaft, and a cam pivoted in a lateral projecting portion of the hanger to bear against the projection of the said collar and thus force the friction wheels into engagement, substantially as described.

Witness my hand to the foregoing specification this 2d day of November, 1892.

WILLIAM W. HODGES.

Witnesses:
 H. T. FISHER,
 GEORGIA SCHAEFFER.